United States Patent
Pfeifer et al.

(10) Patent No.: US 9,766,160 B2
(45) Date of Patent: Sep. 19, 2017

(54) METHOD FOR GENERATING A PULSE SIGNAL SEQUENCE

(75) Inventors: Uwe Pfeifer, Berlin (DE); Michael Zidorn, Stahnsdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 604 days.

(21) Appl. No.: 14/237,877

(22) PCT Filed: Jul. 17, 2012

(86) PCT No.: PCT/EP2012/063981
§ 371 (c)(1),
(2), (4) Date: Feb. 17, 2014

(87) PCT Pub. No.: WO2013/029867
PCT Pub. Date: Mar. 7, 2013

(65) Prior Publication Data
US 2014/0188420 A1    Jul. 3, 2014

(30) Foreign Application Priority Data

Aug. 26, 2011 (EP) ..................................... 11178977

(51) Int. Cl.
*G01R 35/00* (2006.01)
*G01M 15/04* (2006.01)
(Continued)

(52) U.S. Cl.
CPC .......... *G01M 15/042* (2013.01); *G01H 1/006* (2013.01); *G06F 1/022* (2013.01)

(58) Field of Classification Search
CPC ....... G01M 15/042; G01H 1/006; G06F 1/022
(Continued)

(56) References Cited

U.S. PATENT DOCUMENTS 5,111,704 A * 5/1992 Hill ........................ G01H 1/006
                                                          702/126
5,736,643 A    4/1998 Boeres et al.
(Continued)

FOREIGN PATENT DOCUMENTS

CN       102109875 A    6/2011
JP       H04246207 A    2/1992
(Continued)

OTHER PUBLICATIONS

Pfeifer U. et al; "Tip timing measurement chain validation with the Universal Tip Timing Calibrator UTTC, approach and experience"; AIP Conference Proceedings; vol. 1457/1; pp. 43-51; ISSN: 0094-243X; DOI: 10.1063/1.4730541; XP055059093; 2012; Jun. 13, 2012.

*Primary Examiner* — Stephanie Bloss
(74) *Attorney, Agent, or Firm* — Beusse Wolter Sanks & Maire

(57) ABSTRACT

A method for generating a pulse signal sequence using a processor unit is provided that allows calibrating a tip timing measurement system in a turbomachine in order to increase operational security and lifespan of the turbomachine. This is achieved by the method having the steps of: storing a number of wait time elements in a memory unit, creating a pulse signal in a signal output unit during at least one processor cycle, reading a wait time element from the memory unit, and creating a null signal in the signal output unit for a number of processor cycles derived from the wait time element read.

7 Claims, 3 Drawing Sheets

(51) Int. Cl.
 *G01H 1/00* (2006.01)
 *G06F 1/02* (2006.01)
(58) Field of Classification Search
 USPC .......................................................... 702/89
 See application file for complete search history.

(56) References Cited

U.S. PATENT DOCUMENTS

| | | | |
|---|---|---|---|
| 5,872,821 A | | 2/1999 | Schoffel |
| 2001/0019313 A1* | | 9/2001 | Takahashi .......... G01R 31/2841 341/147 |
| 2002/0059004 A1 | | 5/2002 | Matsui |
| 2008/0177485 A1* | | 7/2008 | Cohen ................... F01D 21/003 702/56 |
| 2012/0148400 A1* | | 6/2012 | Gerez ................... F01D 21/045 416/1 |

FOREIGN PATENT DOCUMENTS

| | | |
|---|---|---|
| JP | H09503579 A | 4/1997 |
| JP | 2000321122 A | 11/2000 |
| JP | 2002152020 A | 5/2002 |
| JP | 2004191351 A | 7/2004 |
| JP | 2004333512 A | 11/2004 |
| JP | 2009218485 A | 9/2009 |

* cited by examiner

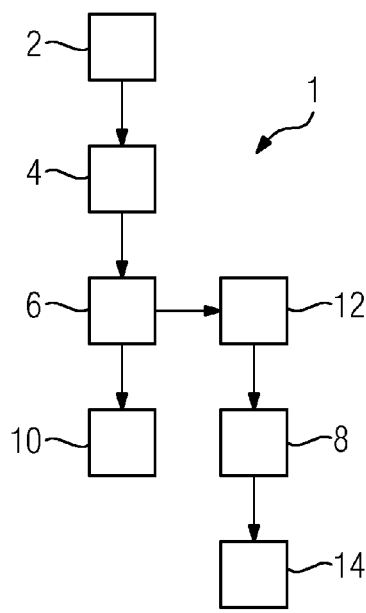
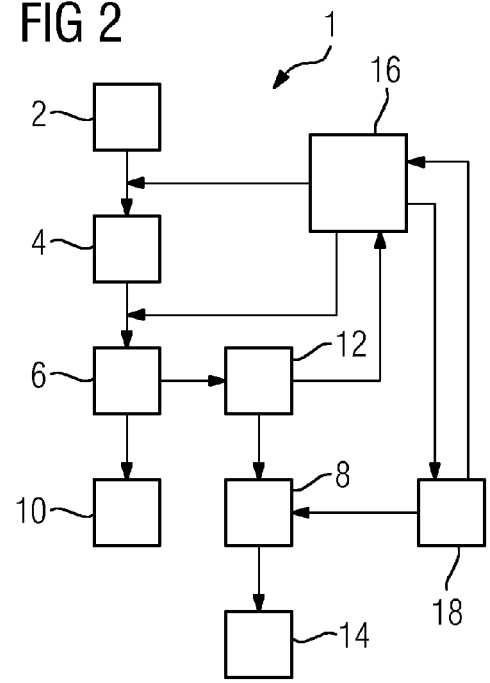
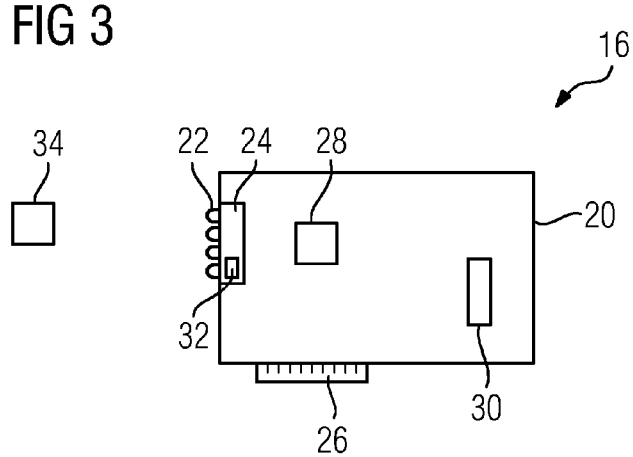

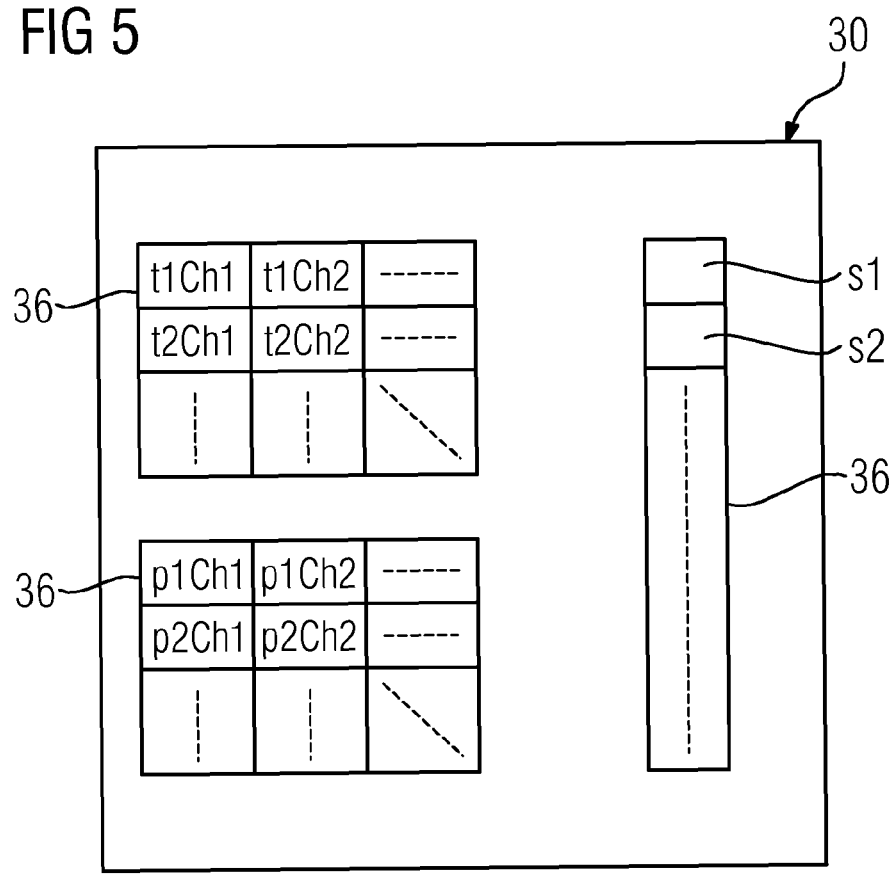

METHOD FOR GENERATING A PULSE SIGNAL SEQUENCE

CROSS REFERENCE TO RELATED APPLICATIONS

This application is the US National Stage of International Application No. PCT/EP2012/063981 filed Jul. 17, 2012, and claims the benefit thereof. The International Application claims the benefit of European Application No. EP11178977 filed Aug. 26, 2011. All of the applications are incorporated by reference herein in their entirety.

FIELD OF INVENTION

The invention concerns a method for generating a pulse signal sequence using a processor unit, in particular for a calibrating system for a tip timing measurement system in a turbomachine or other rotating equipment.

BACKGROUND OF INVENTION

A turbomachine, in mechanical engineering, is a machine that transfers energy between a rotor and a fluid, including both turbines and compressors. While a turbine transfers energy from a fluid to a rotor, a compressor transfers energy from a rotor to a fluid. The simplest turbines have one moving part, a rotor assembly, which is a shaft or drum with blades attached. Moving fluid acts on the blades, or the blades react to the flow, so that they move and impart rotational energy to the rotor. Thus, the blades are responsible for extracting energy from—in particular in gas and steam turbines—the high temperature, high pressure gas flowing through the turbine.

Turbine blades are subjected to very strenuous environments, particularly inside a gas turbine. They face high temperatures, high stresses, and a potentially high vibration environment. All three of these factors can lead to blade failures, which can destroy the engine, and turbine blades are carefully designed to resist those conditions. Therefore, the turbine blades are often the limiting component of gas turbines. To survive in this difficult environment, turbine blades often use exotic materials like superalloys and many different methods of cooling, such as internal air channels, boundary layer cooling, and thermal barrier coatings.

In addition, regarding turbine blade vibration, a continuous monitoring of the blade vibration during operation of turbine is usually done to detect resonant and potentially damaging vibrations early and to be able to counteract. To avoid interference with the operation of the turbine, this is usually done by means of Blade Vibration Tip Timing Measurement (BVTTM) systems that are used for contactless measurement of blade vibration amplitudes and to determine blade assembly vibration frequencies. These systems can be applied to both steam turbines and gas turbines, the application however not being limited to those types of turbomachines.

A BVTTM system in principle usually measures the run time of the tip of the rotating blades between at least two circumferential sensors to a very high precision. Vibrations of the blades will result in shorter or longer run times. These run time variations are measured and used to calculate blade vibration amplitudes. BVTTM systems usually include at least four main components:

Multiple sensors (including power supply, cooling, cabling, signal converters, etc.),
Trigger logic and time-of-arrival measurement hardware or software algorithms,
Real time data analysis and data display device including data storage, and
Off-line data analysis software.

The complete measurement chain from the sensor to the displayed and stored results is subject to numerous error sources, which can have substantial impact to the final result. Special attention has to be paid to the mathematical algorithms which are implemented in the software. These mathematical routines are highly complicated and make use of indirect and iterative computation algorithms which are often random based and use empirical assumptions and hypothesis. Consequently, the behaviour of the system is not fully predictable and the measurement accuracy is unknown under special circumstances and sensor probe setups. In the extreme, this can result in a complete failure of the displayed results, either in amplitude or in frequency.

Therefore, BVTTM systems often fail to produce correct results starting from the first day of operation of a new turbomachine and have to be calibrated and adjusted to the particular turbomachine they are installed in during the first run. This of course is a security risk because vibrations may not be properly detected and damage to the turbomachine may occur during the first run, in particular when e.g. a new turbine prototype with unknown mechanical properties is tested.

In principle, this problem could be solved by calibrating the BVTTM system prior to operation by feeding artificially created and thus known input signals to the BVTTM system, checking the results produced by the BVTTM system and fine-tune the system while comparing its results to the known input. In general, pulse generators using digital or analogue techniques or a combination of both could be used for creating these input signals.

However, it turns out that methods for generating a pulse signal sequence available in the prior art are unable to produce the pulse signals required for calibration of a BVTTM system. The reason for this is the specific nature of the raw signals detected by the sensors. The pulse sequences need to be created with a time precision in the nanosecond range, which requires pulse generators with a processor unit with clock frequencies in the triple-digit megahertz range, i.e. more than 100 million processor cycles per second. In addition, the time differences between the pulses are non-periodic when arbitrary vibration frequencies are simulated. As BVTTM systems require several seconds of measurement time for proper function, this means that several thousand to hundred thousand pulses with different time intervals have to be created. Due to the fact that BVTTM systems require at least two sensors, these pulse signal sequences have to be created for a plurality of channels simultaneously.

The problem needed to be solved is to provide a method for generating a pulse signal sequence using a processor unit that allows calibrating a tip timing measurement system in a turbomachine in order to increase operational security and lifespan of the turbomachine.

SUMMARY OF INVENTION

This problem is inventively solved by a method comprising the steps of:
storing a number of wait time elements in a memory unit,
creating a pulse signal in a signal output unit during at least one processor cycle, reading a wait time element from said memory unit, and creating a null signal in said signal output unit for a number of processor cycles derived from said wait time element read.

The invention is based on the consideration that the reason for pulse generators of the prior art not being able to produce the required pulse signal sequences is memory usage. Although pulse generators of the prior art may provide the required time resolution (processor clock frequency of 100-1000 MHz), they can only create arbitrary pulse sequences for very short periods in the millisecond range. This short period is insufficient for obtaining measurement results in a BVTTM system that needs periods of more than 10 seconds, for a proper calibration rather 100-1000 seconds.

The inventors have recognized that the reason for this is the memory architecture of the pulse generators of the prior art. Usually, the desired output is stored in a memory, using one byte for a given logical state at a given time. The pulse sequence is then created by successively reading the bytes in each processor cycle and producing the corresponding signal as read from the byte in a signal output unit. Using this method, a one-channel pulse sequence at 100 MHz clock frequency (i.e. 10 ns resolution) and 10 seconds duration will require 953 MB of memory. A system with 16 parallel channels would require 16 GB of memory. This memory size combined with the required access speed is currently technically impossible. The inventors have recognized that this is the reason why pulse generators with the properties required for calibrating a BVTTM system are unavailable in the prior art.

To improve the available methods in order to obtain a longer pulse sequence for calibrating a BVTTM system, memory usage should therefore be optimized. Here, the structure of the required pulses for calibrating a BVTTM system can be used. Tip timing sensors create defined pulses interspersed with null signal periods of varying length. Thus, the required signal comprises null signal periods whose only characteristic is their length, the length corresponding to a wait time between pulses. Thus, instead of filling the memory unit with null values for each of the processor cycles during the wait time, the same information should be stored as a single wait time element containing the duration of the wait time between pulses in the memory unit, either in units of processor cycles or in units of time, which can be easily transformed into processor cycles for a known clock frequency. Instead of continuously reading memory elements for each processor cycle and directly forwarding the read data to a signal output unit, after creating a pulse signal a wait time element is read from the memory unit, and a null signal in the signal output unit is created for a number of processor cycles derived from said wait time element read. During the wait time, no memory is accessed because the system enters a wait state.

Note that a null signal is of course output between the end of one pulse and the beginning of the next pulse. The wait time element could either directly contain the time from the end of one pulse to the beginning of the next pulse or contain the time from the beginning of one pulse to the beginning of the next pulse, indicating a wait time between initiating a first pulse and initiating a second pulse. In the first case, the number of processor cycles in which a null signal is output will be calculated directly from the time contained in the wait time element. In the second case, the number of processor cycles in which a null signal is output is calculated from the time in the wait time element minus the time of the first pulse length. In both cases, the number however is derived from the time in the wait time element.

Advantageously, the method comprises the step of storing a plurality of pulse shape elements in said memory unit. This allows the definition of different pulse shapes that can extend over several processor cycles with different length, height and other characteristics. These pulse shapes can then be used whenever a certain pulse is to be created by the signal by simply referring to the memory part that the pulse shapes are stored in.

In a further advantageous embodiment, the method further comprises the step of storing a plurality of pulse shape identifier elements in said memory unit, each pulse shape identifier element referring to one of said pulse shape elements. Then, creating a pulse signal comprises reading a pulse shape identifier element from said memory unit and creating the pulse signal according to the respective pulse shape element referred to by said pulse shape identifier element read. This allows not only to save memory by using predefined pulse shapes but also to create arbitrary consecutive combinations of different pulse shapes according to the predefined patterns. In this embodiment, during creation of the signal sequence, pulse shape identifier elements and wait time elements will be read alternately from the memory. Upon reading of the pulse shape identifier element, the pulse shape pattern stored in the pulse shape element it refers to is sent to the output, for the number of processor cycles corresponding to the length of the pulse shape element. Then, a wait time element is read from the memory and a null signal is sent to the output for the number of processor cycles derived from the wait time stored in the wait time element. Creating a sequence of pulse shape identifier elements and wait time elements and storing it in memory with some information regarding the ordering therefore provides sufficient degrees of freedom regarding the signals required for calibrating a BVTTM system.

Advantageously, the signals created in said signal output unit for each cycle are fed into a digital-to-analogue converter. This allows a continuous analogue signal creation as required for calibrating a BVTTM system.

Advantageously a pulse generator comprising a processor unit, a memory unit, a signal output unit and a digital-to-analogue converter is operable to execute the described method.

A calibrating system for a tip timing measurement system in a turbomachine advantageously comprises said pulse generator. As described above, the method described above dramatically reduces memory usage and allows creation of pulse signals with a highly increased duration. The lowered memory usage also allows simultaneous creation of several signals at once, thus the calibrating system advantageously comprises a plurality of said pulse generators, the pulse generator clock cycles being synchronized. Therefore, the signals of all BVTTM sensors can be simulated in order to calibrate the system.

A tip timing measurement system for a turbomachine is advantageously calibrated with the described calibrating system. This allows a particularly high operational safety from the first second of running a new turbomachine because the BVTTM system will immediately deliver correct, high-quality results.

Advantageously, a turbomachine, particularly a gas turbine, comprises the described tip timing measurement system and a power plant advantageously comprises such a turbomachine.

The advantages achieved by the invention particularly comprise that by storing pulse sequences by means of pulse shapes interspersed with wait time elements the memory usage is dramatically reduced. As a time-equidistant accessing of the memory and thus a memory usage dependent on the clock frequency of the processor of the pulse generator are no longer existent, the output of longer pulse sequences with a nanosecond resolution becomes possible. Using these pulse signals for calibrating a BVTTM system of a turbomachine, e.g. a steam or gas turbine increases operational safety, particularly during first operation.

BRIEF DESCRIPTION OF THE DRAWINGS

An exemplary embodiment of the invention is described in the following with the aid of a figure. Here, the FIG. 1 shows a flow schematic of a blade vibration tip timing measurement (BVTTM) system, FIG. 2 shows the flow schematic of FIG. 1 together with a schematic representation of a calibration system and its interaction with the BVTTM system, FIG. 3 shows a schematic of a calibrating system for a BVTTM system, FIG. 5 shows a schematic representation of the memory structure of the calibrating system.

DETAILED DESCRIPTION OF INVENTION

Figure 4:
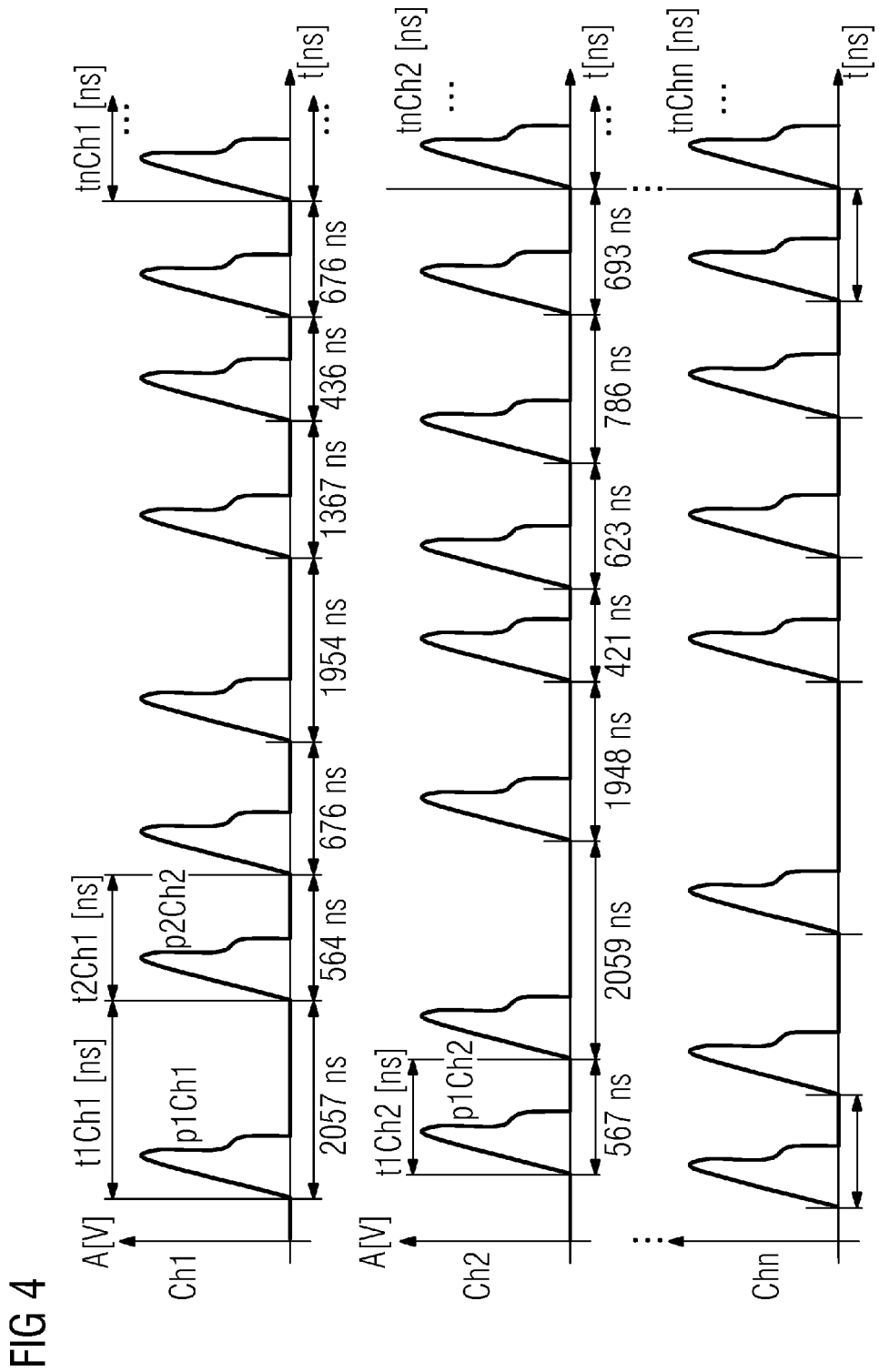
FIG. 4 shows a graph of a typical pulse pattern created by the calibrating system.

A BVTTM system 1 as used e.g. in a steam or gas turbine (not shown) in a power plant (not shown) is very complex and includes multiple components, as depicted in FIG. 1. Starting with the raw sensor signals 2 that are fed to trigger logic and signal amplifiers 4 collected in a plurality of sensors in the turbine, numerous factors can be identified which are impacting the actual pulse shape and time delay. This depends mainly on the sensor type (optical, eddy current, magnetic or RF) itself and its intrinsic time domain characteristics as well as on the interaction with the specific geometric blade profile as well. In case of large vibration amplitudes or changing tip clearances these parameters may change and can pretend false time delays.

Imagining the very small fractions of time in the nanosecond range, many effects have to be considered in a comprehensive and complete error impact analysis. Not only the time domain transfer behaviour of all involved electronic components must be evaluated, the simple length and the type of the signal cables is also important. The signal trigger logic or the arrival-of-time calculation algorithm is also subject to different influence parameters. The system's base clock resolution and the A/D converter parameter as well can have major impact to the BVTTM system amplitude resolution.

The vibration amplitude resolution is a direct function of the real or virtual system clock frequency, i.e. how precise the arrival-of-time decomposition can be measured. At typical circumferential velocities of 300-500 m/s in turbines, a clock frequency of 83 MHz can resolve a minimal vibration amplitude of around 5 micrometers directly, which is not assumed to be sufficient for some higher engine order mode detection. A 83 MHz base clock frequency corresponds to a time interval of 12 ns.

For a detailed error root cause analysis which enables the separation of the uncertainty effects from different origins, it is necessary to analyse the different parts of the measurement chain with separate and specialized tools and test setups. So far, there are no tools or procedures known or described in the literature. Another important aspect is to ensure the full traceability to international measurement standards as time or frequency normals for the entire device.

However, the most important impact on the final vibration event result is caused by the mathematical frequency reconstruction algorithm. The algorithm comprises a real-time part 6 and an off-line part 8. The real-time algorithm 6 provides quickly obtainable results to a display output 10 for monitoring and alerting in the case of vibrations that exceed operational safety limits. The obtained data is also stored in a data file 12 which is then evaluated by the off-line algorithm to provide more sophisticated results 14. Since these algorithms are hidden and not published in most BVTTM systems 1, the functionality could be evaluated in the prior art only by means of an in-situ process.

Being aware of this situation, the following approach based on the idea of calibrating the BVTTM system 1 was developed. Inside the measurement chain certain points have been identified enabling to "inject" artificial signals or digital information. If these signals can be generated with known content, the injection into the BVTTM system 1 must induce a response and produce a result 14, which can be compared then to the known input. These injection points are depicted in FIG. 2 showing the BVTTM system 1 of FIG. 1 with additional content.

The calibrating system 16 shown in FIG. 2 is able to generate optical and electrical pulses according to various vibration patterns. These are fed both to the trigger logic and signal amplifiers 4 and to the real-time algorithm 6. Additionally, it provides digital information as artificial data files 18, to inject these data to the off-line algorithm part 8 of the BVTTM system 1. On the other hand, the calibrating system 16 also provides the functionality to read captured measurement data files 12 and to reproduce the pulse sequences.

The very complex matter of tip timing signals does not allow to refer to simple physical and readily available laboratory standards in a standard working procedure. Even very sophisticated and expensive arbitrary wave and pattern generators of the prior art are not able to generate signals with the required flexibility, accuracy and sequence duration. Only very simple and restricted pulse patterns can be produced, which are completely unsuited to be used as calibration signals for multi-sensor tip timing measurement systems 1 of the last generation. In the prior art, these BVTTM systems 1 could therefore not be tested and calibrated completely within their dedicated application range regarding blade vibration amplitude, frequency and dynamic response.

The calibrating system 16 shown in FIG. 2 and in more detail in FIG. 3 can support the signal "injection" procedure described above in a universal and flexible manner. The device features multiple hardware channels, embedded in powerful software and an intuitive graphical user interface. It is able to simulate the common blade vibration scenarios of a rotating gas or steam turbine.

To this end, the calibrating system 16 comprises a tailored, field programmable gate array (FPGA) powered application-specific integrated circuit (ASIC) peripheral component interconnect (PCI)-card 20, shown in FIG. 3. These cards can be designed as 2- or 4-channel cards and several PCI cards 20 can be combined to multichannel systems with up to 12 channels today. The example of FIG. 3 shows a single PCI-card 20 with four output connectors 22 in signal output unit 24. The PCI-card is connected via PCI connector 26 to a standard personal computer system (not shown).

The PCI-card 20 further comprises a FPGA processor unit 28 and a high speed dynamic random-access memory (DRAM) unit 30. All elements are connected through printed circuitry on the PCI-card 20. The processor unit 28 features 500 MHz clock frequency, i.e. 2 nanosecond resolution. The clock has a 10 picosecond precision. The four channels of output connectors 22 are synchronized and output analogue signals in form of electrical TTL pulses with about 0.5 nanosecond rising/falling time converted by digital-analogue converter 32 in output unit 24. If desired, the pulse shape can be formed by small capacitors to get analogue sensor shaped signals.

Due to a particular method implemented in processor unit 28 and memory unit 30 and described below, the PCI-card 20 is fully flexible and has no pulse pattern constraints, no pulse time length limitations, and is able to create pulse sequences with 4 million pulses per channel. The 2 nanosecond time resolution enables to generate vibration amplitudes with an accuracy below 0.1 micrometers, depending on the disk speed.

As a typical test example, a common start-up sequence of a gas turbine with 15 minutes duration has approximately 30000 revolutions. Assumed there are 50 blades in the row this will result in 1.5 million pulses, so the 4-million pulse capability is sufficient to simulate complete start up sequences and long lasting turbine runs. This feature is very essential to test the long term response of a BVTTM system 1.

For optical BVTTM systems 1 to be tested, a laser booster 34 is available to transform the electrical pulses to laser light beams of different wavelengths. This enables to inject digital pulses with either 660 or 830 nm wavelength to the trigger logic and signal amplifiers 4 (see FIG. 2). To inject digital data to the BVTTM system 1 into the off-line algorithm 8, the calibrating system 16 generates artificial data files 18 with known content. Various file formats are supported for different BVTTM systems 1.

During development of the calibrating system 16, special attention was dedicated to enable an efficient device application during the BVTTM system 1 validation process. Consequently, a general work flow was developed. The calibration process starts with the definition of the engine parameters like number of blades, blade stacking mode and blade thickness. It continues with the input of the instrumentation setup, i.e. how many sensors shall be attached and at which circumferential position.

Next, one of two provided basic engine operation modes is chosen. The calibration system 16 is able to simulate continuous or transient speed engine operation modes. During the continuous-wave mode (cw), the rotor speed remains constant or can be slightly modulated to simulate the behaviour of a rotor speed controller. The speed modulation amplitude and frequency can be adjusted according the known properties of the turbine drive train. Usually the speed modulation amplitudes are in the range of a few mHz in case of a synchronized turbine operation, but, nevertheless necessary to obtain realistic vibration scenarios. Otherwise, the transient (tr) mode enables the simulation of a complete engine start-up from idle to nominal speed.

The rotor acceleration, i.e. the speed ramp is expressed as a speed versus time function by a third-order polynomial. By choosing the coefficients properly, flexible and non-linear speed ramps can be simulated.

To support an efficient usage of the calibration system 16, all these numerous parameters can be stored and re-read in a predefined EXCEL worksheet. The EXCEL format of the setup parameter file also enables an independent preparation of different test setups and test scenarios without having the calibration software present. Especially the next step in the workflow will require hundreds of input parameters, which can be generated and accessed easily by EXCEL's drag-and-drop worksheet functionality.

To address the blade vibration mode, the calibration system 1 provides simple and quite complex vibration patterns, which are different for the cw- and the tr-mode. For the cw-mode, the blade vibration mode is characterized by three vibration pattern groups:

Blade vibration pattern A is a simple mode, in which all blades of a disk are having the same vibration amplitudes and frequencies and are in the same phase. But, up to ten vibration modes can be superimposed synchronously with different frequencies, amplitudes and phases.

Blade vibration pattern B is characterized by assigning individual phases to individual blades. This is found to be a nice feature for simulating synchronous blade and disk vibration phenomena (daisy flower vibration patterns).

Blade vibration pattern C enables a complete blade individual assignment of the amplitudes, frequencies and phase of all ten vibration modes.

Another important feature for a realistic BVTTM test is the generation of noise-distorted blade vibration signals. All three vibration patterns for the cw-mode are able to be superimposed with a desired noise vibration amplitude (white noise). For vibration pattern A, the noise amplitude is mode specific, for patterns B and C, it can be chosen individually for each blade.

The transient mode requires some more parameters to simulate a true engine behaviour. During the acceleration of the rotor the blades are subject to excitation forces depending on the current speed. If the excitation frequency coincides with one of the blade's natural frequencies, a vibration mode excitation occurs. This excitation event is characterized by a certain maximum amplitude and is showing an individual damping response, which can be described by an envelope shaping function. Using a symmetrical Gauss bell curve, it is possible to adapt the envelope shape to the desired damping characteristic to be simulated.

When the above mentioned steps are finished and a blade vibration pattern has been defined for calibrating the BVTTM system 1, the calibrating system 16 calculates the sensor signals 2 that the defined blade vibration pattern would produce in the given BVTTM sensor configuration. A general example of such sensor signals 2 is depicted in FIG. 4.

FIG. 4 shows an example of n signal channels Ch1, Ch2 . . . Chn, each channel Ch1, Ch2 . . . Chn, being depicted by a graph showing the signal amplitude in volts against time in nanoseconds. Each channel Ch1, Ch2 . . . Chn shows a number of pulses with interspersed periods of null signal. Although the shape of the pulses looks the same in FIG. 4, arbitrary pulse patterns are possible. The calibrating system 16 uses a number of predefined shapes and each pulse has an assigned pulse shape identifier element p1Ch1, p2Ch1, p1Ch2, etc. (pXChY denoting the Xth pulse of the Yth channel). The time from the beginning of the Xth pulse to the beginning of the next pulse in the Yth channel is denoted tXChY, stored in wait time elements t1Ch1, t2Ch1, t1Ch2, etc. The sequence length is limited only by the storage volume in the memory unit for the n numbers for the wait time elements tXChY. The sequence can be periodically repeated.

FIG. 5 shows how the pulse patterns of FIG. 4 are stored in the memory unit 30 in order to be able to be reproduced. In memory unit 30, three arrays 36 are stored. The first array 36 comprises n pulse shape elements s1, s2 . . . sn. The pulse shape elements s1, s2 . . . sn contain a sequence of amplitude values that form a certain pulse shape. The second array 36 contains the pulse shape identifier elements p1Ch1, p1Ch2, p2Ch1, etc. Each pulse shape identifier element p1Ch1, p1Ch2, p2Ch1 contains a reference to one of the predefined pulse shape elements s1, s2 . . . sn, e.g. p1Ch1 refers to pulse shape element s2. The third array 36 contains the wait time elements t1Ch1, t1Ch2, t2Ch1, etc. Each wait time element t1Ch1, t1Ch2, t2Ch1 contains a number in nanoseconds. According to FIG. 4, t1Ch1 contains the number 2057, t2Ch2 contains the number 564 respectively.

The processor unit 28 now reads the arrays 36 in parallel for each channel, i.e. p1Ch1 and t1Ch1 are first read for channel Ch1, p1Ch2 and t1Ch2 are read for channel Ch2 and so on. The processor unit 28 induces creation of the pulse corresponding to the pulse shape element referred to in the pulse shape identifier element read in the signal output unit 24, e.g. pulse shape element s2 for p1Ch1 and then waits the time read from the first wait time element t1Ch1, i.e. 2057 ns in channel Ch1. This is done in each channel Ch1, Ch2 . . . Chn, respectively.

Consequently, the signal output unit 24 will output a null signal in channel Ch1 for the duration of 2057 ns minus the time length of the pulse according to s2, referred to by p1Ch1 without any memory access necessary during this time. The time can be easily converted into processor cycles on the basis of a clock frequency of 500 MHz in the example.

This reduces memory usage dramatically and therefore decreases the number of memory accesses and allows the long pulse sequences required for calibrating system 16.

The invention claimed is:

1. A method for calibrating a tip timing measurement system in a turbomachine, wherein a blade vibration pattern with a plurality of pulse signals is created and fed into a blade vibration tip timing measurement (BVTTM) system, wherein creating a blade vibration pattern comprises generating a pulse signal sequence for each channel of a plurality of parallel channels using a processor unit, the method comprising:

storing a first array comprising a plurality of predefined pulse shape elements in a memory unit, the plurality of predefined pulse shape elements contain the pulse signal sequence of amplitude values that form a pulse shape;

storing a second array comprising a plurality of pulse shape identifier elements for the plurality of parallel channels in the memory unit, each pulse shape identifier comprises a reference to a predefined pulse shape element;

storing a third array of a plurality of wait time elements for the plurality of parallel channels in the memory unit, each wait time element comprising a time length; and performing in parallel for each channel:

creating a pulse signal having a pulse length in a signal output unit during at least one processor cycle wherein the pulse signal includes a pulse shape having the amplitude values for the pulse length of a predefined pulse shape element referred to by the pulse shape identifier element of the respective channel read from the second array stored in the memory unit, reading a wait time element from said memory unit, after creating the pulse signal of the respective channel, waiting a wait time derived based on the time length of the wait time element for the respective channel read by the processor unit, during the wait time, creating a null signal in said signal output unit for a number of processor cycles derived from said wait time element read, feeding the signals created in said signal output unit for each cycle into a digital-to-analog converter, and repeating the steps of creating a pulse signal, reading a wait time element, waiting, and creating a null signal for each pulse signal in the pulse signal sequence of said each channel.

2. A calibrating system for a tip timing measurement system in a turbomachine comprising a pulse generator comprising a processor unit, a memory unit, a signal output unit and a digital-to-analog converter, the system configured to execute the method according to claim 1.

3. The calibrating system of claim 2, comprising a plurality of said pulse generators, wherein the pulse generator clock cycles are synchronized.

4. The method of claim 1, wherein the null signal whose only characteristic is a length corresponding to the wait time between pulses.

5. The method of claim 1, wherein the pulse shape includes an analogue sensor shaped signal.

6. The method of claim 1, wherein tip timing sensors create defined pulses interspersed with null signal periods of varying length.

7. The method of claim 1, wherein the pulse signal sequence being based on a blade vibration pattern.

* * * * *